(12) United States Patent
Forman et al.

(10) Patent No.: US 7,716,741 B2
(45) Date of Patent: May 11, 2010

(54) METHOD AND SYSTEM FOR OFFLOADING REAL-TIME VIRUS SCANNING DURING DATA TRANSFER TO STORAGE PERIPHERALS

(75) Inventors: Ira R. Forman, Austin, TX (US); Lane Thomas Holloway, Pflugerville, TX (US); Nadeem Malik, Austin, TX (US); Marques Benjamin Quiller, Plugerville, TX (US)

(73) Assignee: International Business Machines Corporation, Armonk, NY (US)

( * ) Notice: Subject to any disclaimer, the term of this patent is extended or adjusted under 35 U.S.C. 154(b) by 1521 days.

(21) Appl. No.: 11/034,266

(22) Filed: Jan. 12, 2005

(65) Prior Publication Data

US 2006/0156405 A1 Jul. 13, 2006

(51) Int. Cl.
*G06F 11/00* (2006.01)
*G06F 12/14* (2006.01)
*G06F 12/16* (2006.01)
*G08B 23/00* (2006.01)

(52) U.S. Cl. .............................. 726/24; 726/23; 713/188
(58) Field of Classification Search .................. 726/23, 726/24; 713/188
See application file for complete search history.

(56) References Cited

U.S. PATENT DOCUMENTS

| 6,105,027 | A  | * | 8/2000 | Schneider et al. ............... 707/9 |
| 6,266,774 | B1 | * | 7/2001 | Sampath et al. ............... 726/24 |
| 2003/0145228 | A1 | * | 7/2003 | Suuronen et al. ............ 713/201 |
| 2005/0050334 | A1 | * | 3/2005 | Liang et al. .................. 713/188 |

* cited by examiner

*Primary Examiner*—Kimyen Vu
*Assistant Examiner*—Randal D Moran
(74) *Attorney, Agent, or Firm*—Yee & Associates, P.C.; Steven L. Bennett

(57) ABSTRACT

The present invention provides a method, system, and computer program product for checking for viruses by adding a virus scanning capability to a data transfer device. In a method of the present invention a real-time virus checker is stored on a controller. The virus checker scans data as it is being written to a file. If a virus is detected, the suspected file is flagged. Anti-virus software is then invoked to perform a scan of the entire suspected file. In this manner, demands on CPU resources to perform scans will be greatly reduced as only those files marked as possibly containing a viruse need to be scanned, rather than scanning all the files on the entire data transfer device.

6 Claims, 3 Drawing Sheets

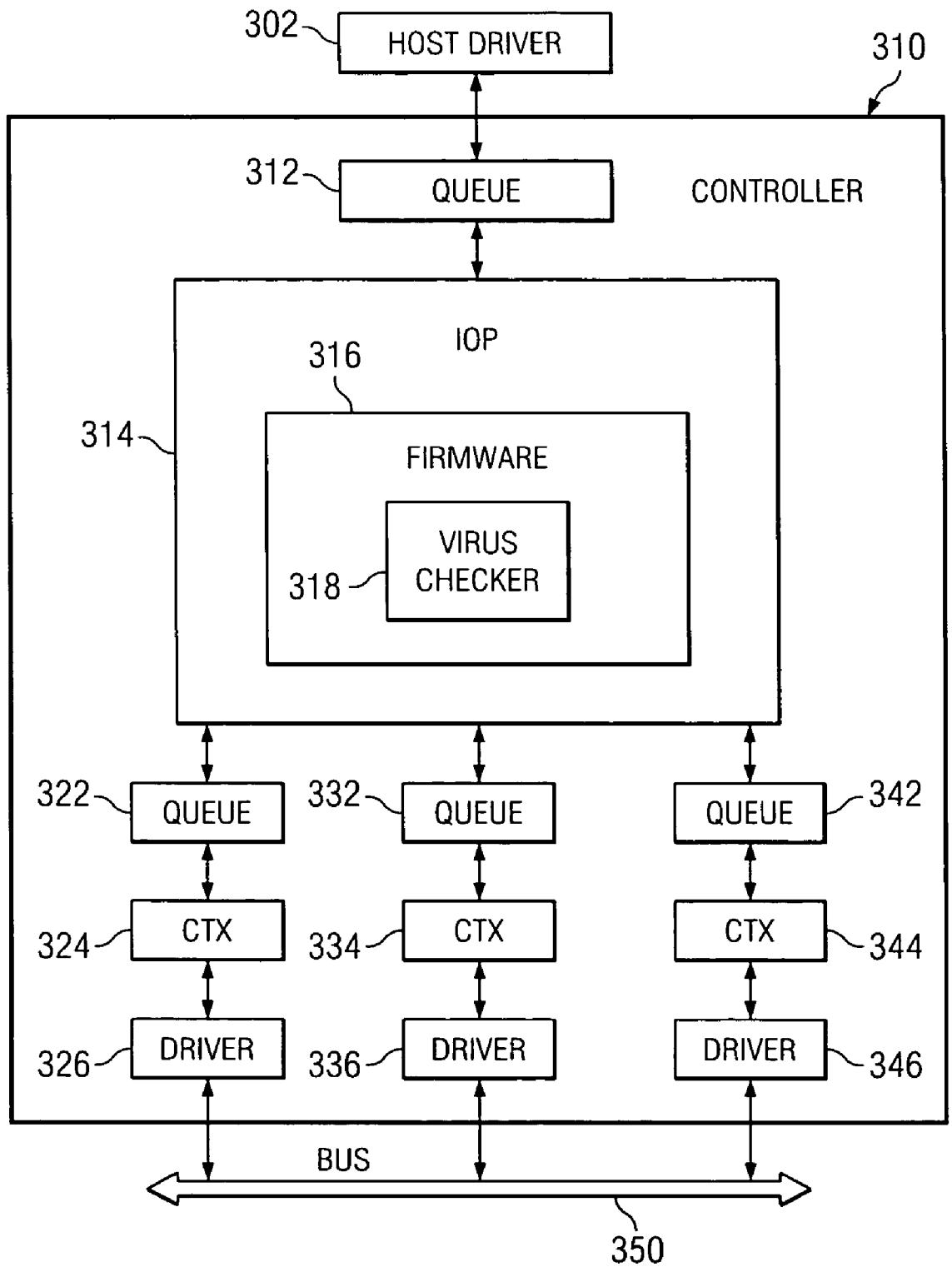

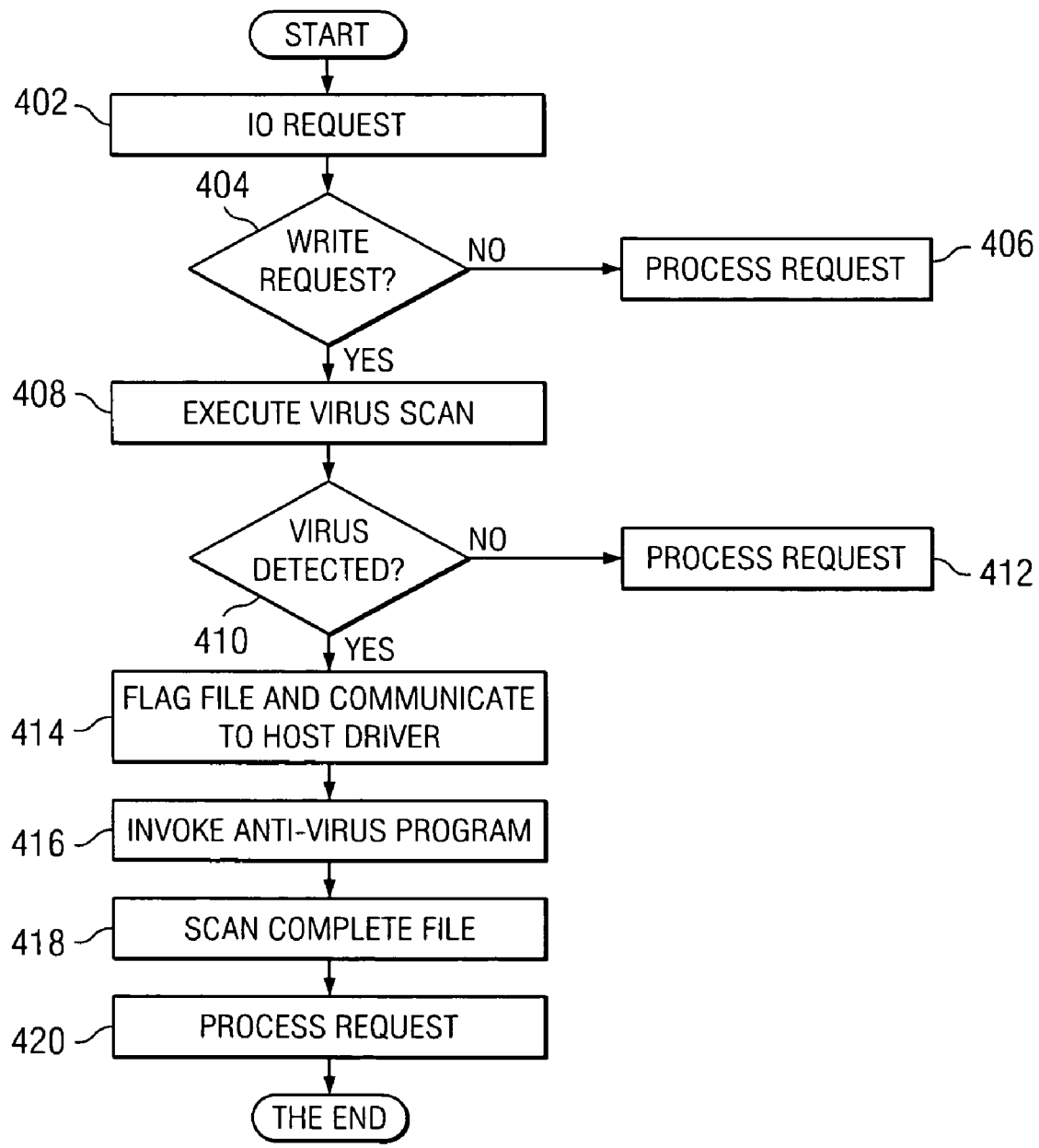

METHOD AND SYSTEM FOR OFFLOADING REAL-TIME VIRUS SCANNING DURING DATA TRANSFER TO STORAGE PERIPHERALS

BACKGROUND OF THE INVENTION

1. Technical Field

The present invention relates to data processing systems and, in particular, to real-time scanning of files by anti-virus software. Still more particularly, the present invention provides a method and system for checking for viruses by adding a virus scanning capability to the peripheral storage controller or data transfer controllers in a data processing system.

2. Description of Related Art

The increased utilization of computers and other electronic communications devices at home, in businesses, and between businesses has expanded dramatically as a result of a similar expansion in the amount of software and information available. Examples of different types of software include word processors, spreadsheet programs, Web design programs, and anti-virus programs.

With the rise of the Internet, the exchange of information between different users has grown significantly. As communication between different users has grown, so too has the proliferation of virus programs grown. Thus, the utilization of anti-virus programs to protect the integrity of computer systems has become commonplace. However, anti-virus programs require a large amount of central processing (CPU) usage to run. The programs also heavily tax busses, such as the small computer systems interface (SCSI) bus, the IDE bus, etc. when scanning the files. Particularly, in a World Wide Web environment, where service providers and consumers meet to conduct business, the need to constantly protect the integrity of the data processing system against threats from virus programs imposes a large cost in both efficiency and overhead, especially for large data centers.

Therefore, it would be advantageous to have an improved method, apparatus, and computer program product for providing real-time virus scanning.

SUMMARY OF THE INVENTION

The present invention provides a method, system, and computer program product for checking for viruses by adding a virus scanning capability to a data transfer device. In a method of the present invention a real-time virus checker is stored on a controller. The virus checker scans data as it is being written to a file. If a virus is detected, the suspected file is flagged. Anti-virus software is then invoked to perform a scan of the entire suspected file. In this manner, demands on CPU resources to perform scans will be greatly reduced as only those files marked as possibly containing a virus need to be scanned, rather than scanning all the files on the entire data transfer device.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 3 is a block diagram of a controller with embedded input/output (IO) processors in accordance with a preferred embodiment of the present invention; and FIG. 4 is a flowchart that illustrates a method for checking for viruses in accordance with a preferred embodiment of the present invention.

DETAILED DESCRIPTION OF THE PREFERRED EMBODIMENT

Figure 1:
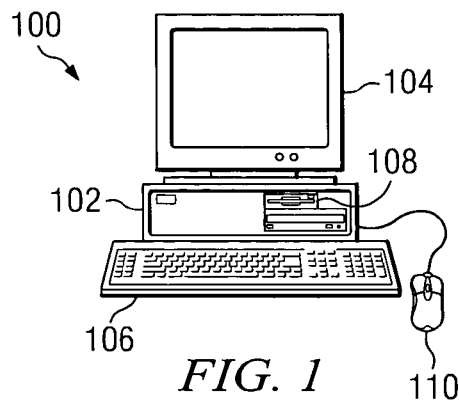
FIG. 1 is a pictorial representation of a data processing system in which the present invention may be implemented in accordance with a preferred embodiment of the present invention.

With reference now to the figures and in particular with reference to FIG. 1, a pictorial representation of a data processing system in which the present invention may be implemented is depicted in accordance with a preferred embodiment of the present invention. A computer 100 is depicted which includes system unit 102, video display terminal 104, keyboard 106, storage devices 108, which may include floppy drives and other types of permanent and removable storage media, and mouse 110. Additional input devices may be included with personal computer 100, such as, for example, a joystick, touchpad, touch screen, trackball, microphone, and the like. Computer 100 can be implemented using any suitable computer, such as an IBM eServer computer or IntelliStation computer, which are products of International Business Machines Corporation, located in Armonk, N.Y. Although the depicted representation shows a computer, other embodiments of the present invention may be implemented in other types of data processing systems, such as a network computer. Computer 100 also preferably includes a graphical user interface (GUI) that may be implemented by means of systems software residing in computer readable media in operation within computer 100.

Figure 2:
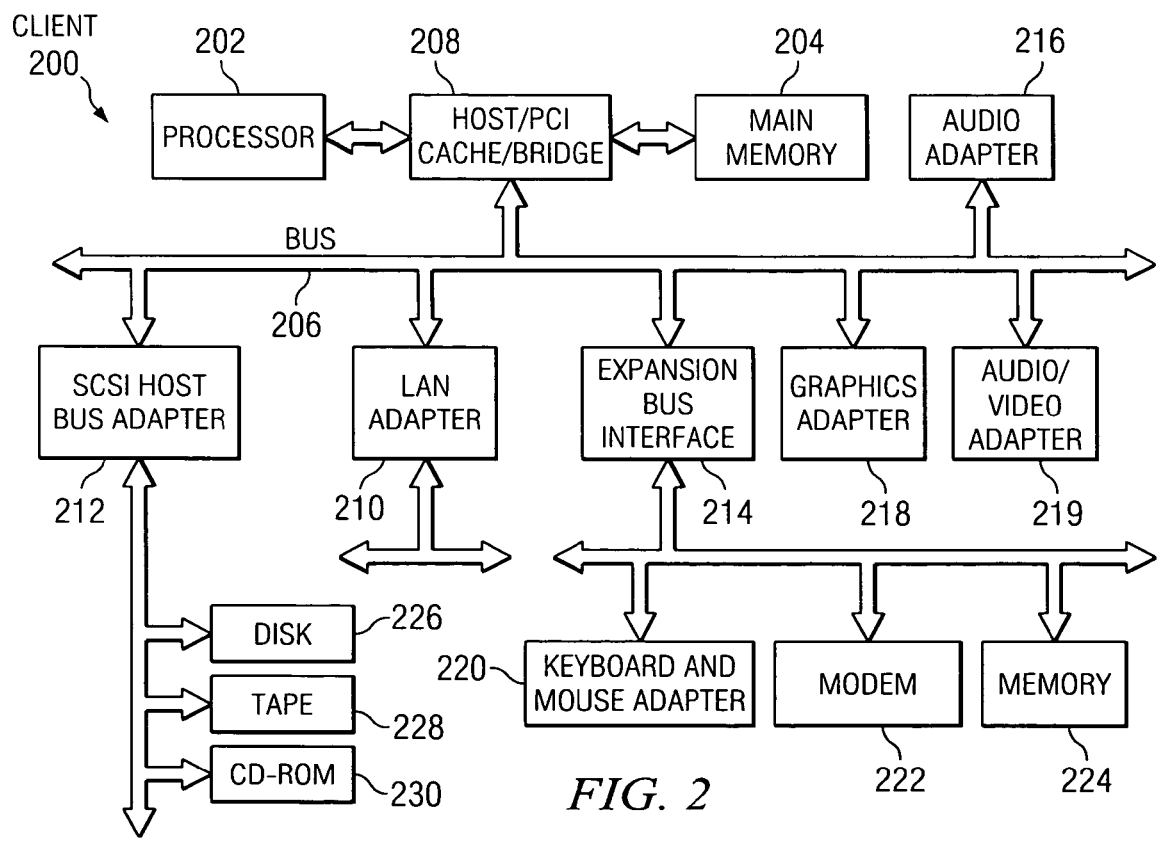
FIG. 2 is a block diagram of a data processing system in which the present invention may be implemented according to a preferred embodiment of the present invention.

With reference now to FIG. 2, a block diagram of a data processing system is shown in which the present invention may be implemented according to a preferred embodiment of the present invention. Data processing system 200 is an example of a computer, such as computer 100 in FIG. 1, in which code or instructions implementing the processes of the present invention may be located. Data processing system 200 employs a peripheral component interconnect (PCI) local bus architecture. Although the depicted example employs a PCI bus, other bus architectures such as Accelerated Graphics Port (AGP) and Industry Standard Architecture (ISA) may be used. Processor 202 and main memory 204 are connected to PCI local bus 206 through PCI bridge 208. PCI bridge 208 also may include an integrated memory controller and cache memory for processor 202. Additional connections to PCI local bus 206 may be made through direct component interconnection or through add-in connectors. In the depicted example, local area network (LAN) adapter 210, small computer system interface (SCSI) host bus adapter 212, and expansion bus interface 214 are connected to PCI local bus 206 by direct component connection. In contrast, audio adapter 216, graphics adapter 218, and audio/video adapter 219 are connected to PCI local bus 206 by add-in boards inserted into expansion slots. Expansion bus interface 214 provides a connection for a keyboard and mouse adapter 220, modem 222, and additional memory 224. SCSI host bus adapter 212 provides a connection for hard disk drive 226, tape drive 228, and CD-ROM drive 230. Typical PCI local bus implementations will support three or four PCI expansion slots or add-in connectors.

An operating system runs on processor 202 and is used to coordinate and provide control of various components within data processing system 200 in FIG. 2. The operating system may be a commercially available operating system such as Windows XP, which is available from Microsoft Corporation. An object oriented programming system such as Java may run in conjunction with the operating system and provides calls to the operating system from Java programs or applications executing on data processing system 200. "Java" is a trademark of Sun Microsystems, Inc. Instructions for the operating system, the object-oriented programming system, and applications or programs are located on storage devices, such as hard disk drive 226, and may be loaded into main memory 204 for execution by processor 202.

Those of ordinary skill in the art will appreciate that the hardware in FIG. 2 may vary depending on the implementation. Other internal hardware or peripheral devices, such as flash read-only memory (ROM), equivalent nonvolatile memory, or optical disk drives and the like, may be used in addition to or in place of the hardware depicted in FIG. 2. Also, the processes of the present invention may be applied to a multiprocessor data processing system.

For example, data processing system 200, if optionally configured as a network computer, may not include SCSI host bus adapter 212, hard disk drive 226, tape drive 228, and CD-ROM 230. In that case, the computer, to be properly called a client computer, includes some type of network communication interface, such as LAN adapter 210, modem 222, or the like. As another example, data processing system 200 may be a stand-alone system configured to be bootable without relying on some type of network communication interface, whether or not data processing system 200 comprises some type of network communication interface. As a further example, data processing system 200 may be a personal digital assistant (PDA), which is configured with ROM and/or flash ROM to provide non-volatile memory for storing operating system files and/or user-generated data.

The depicted example in FIG. 2 and above-described examples are not meant to imply architectural limitations. For example, data processing system 200 also may be a notebook computer or hand held computer in addition to taking the form of a PDA. Data processing system 200 also may be a kiosk or a Web appliance.

The processes of the present invention may be performed by processor 202 using computer implemented instructions, which may be located in a memory such as, for example, main memory 204, memory 224, or in one or more peripheral devices 226-230.

With reference now to FIG. 3, a block diagram of a controller with embedded input/output (IO) processors is shown in accordance with a preferred embodiment of the present invention. Controller 310 receives IO requests from host driver 302 and performs IO operations on bus 350. Host driver 302 may be any driver that requests IO operations on controller 310. In a preferred embodiment, the host driver is a software device driver running in an instance of the operating system of a server, which has been modified to accept flags and to invoke an anti-virus program. The controller may be any data transfer device, such as, but not limited to, SCSI, Infiniband, IDE, Fibrechannel, Floppy Drive, Firewire, USB or serial ATA controller.

Controller 310 uses embedded firmware 316 running on several different embedded processors. One of the processors is IO processor (IOP) 314, which is a control processor that receives IO requests from the host driver and routes the IO to an appropriate lower level processor. The lower level processors include context manager (CTX) processors 324, 334, 344. The appropriate one of CTX processors 324, 334, 344 completes the IO operation. Host driver 302 may send IO requests to IOP 314 using a message-based interface (MPT). Those of ordinary skill in the art will appreciate that the hardware depicted in FIG. 3 may vary. For example, although the system shown in FIG. 3 includes three CTX processors, more or fewer processors may be used depending on the implementation. The depicted example is not meant to imply architectural limitations with respect to the present invention.

The host driver posts request IO message frames to controller 310 via request queue 312. These IO message frames sit in a first in, first out (FIFO) queue waiting to be processed by the IOP. The IOP also routes IO messages to CTX processors 324, 334, 344 via queues 322, 332, 342, respectively. The CTX processors receive IO messages on the queues. CTX processors 324, 334, 344 then process the IO messages and drive data onto bus 350 via drivers 326, 336, 346. CTX processors 324, 334, 344 drive the data onto the bus using the specifications of the bus. For example, if the controller is a SCSI controller, then the CTX processors drive data onto the bus using SCSI specifications.

In accordance with a preferred embodiment of the present invention, controller 310 includes embedded firmware 316 within IOP 314. When IOP 314 receives a request to write data from request queue 312, a real-time virus checker 318 contained in firmware 316 checks the data that is being requested to be written through use of a virus dictionary. However, the virus checker could also check the data utilizing heuristic techniques (behavior detection) or a combination of both heuristic techniques and a virus dictionary. If a virus is detected then the file associated with the data to be written is flagged. The flagging can be accomplished in various ways such as, but not limited to, by using an OS level write command or a file descriptor table. This information is then communicated back to the host driver 302. Host driver 302 then invokes an anti-virus program which can examine the entire file.

FIG. 4 is a flowchart that illustrates a method for checking for viruses in accordance with a preferred embodiment of the present invention. The method begins when an IO data transfer request is received by IOP 314 from request queue 312 (step 402). A determination is made as to whether the request is a request to write data (step 404). If the request is not a request to write data (no output of step 404) then the request is processed as normal (step 406). If the request is determined to be a write request (yes output of step 404) then a real-time virus checker 318 contained in firmware 316 is executed (step 408). The real-time virus checker scans the data to be written against a virus dictionary and/or by using heuristic techniques, and a determination is made as to whether or not a virus is detected (step 410). If no virus is detected (no output of step 410) then the request is processed as normal (step 412). If a virus is detected (yes output of step 410) then firmware 316 flags the file associated with the data to be written and communicates back to host driver 302 (step 414), which then invokes an anti-virus program (step 416). A dynamic link library (dll) file is used to tell the anti-virus program which file to scan and then the anti-virus program performs a complete examination of the flagged file (step 418). The IO request is then processed (step 420) and the method ends.

It should be understood that the process illustrated in FIG. 4 is exemplary only and may be modified in various ways depending on particular implementations. For example, there are many other ways by which the anti-virus program can be instructed to scan the proper file, including, but not limited to, programmatically by using a programming language command.

Thus, the present invention solves the disadvantages of the prior art by providing a real-time virus scanning capability in a data transfer device. The present invention provides a method, system, and computer program product for checking for viruses by adding a virus scanning capability to a data transfer device. In a method of the present invention a real-time virus checker is stored on a controller. The virus checker scans data as it is being written to a file. If a virus is detected, the suspected file is flagged. Anti-virus software is then invoked to perform a scan of the entire suspected file. In this manner, demands on CPU resources to perform scans will be greatly reduced as only those files marked as possibly containing a virus need to be scanned, rather than scanning all the files on the entire data transfer device.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media, such as a floppy disk, a hard disk drive, a RAM, CD-ROMs, DVD-ROMs, and transmission-type media, such as digital and analog communications links, wired or wireless communications links using transmission forms, such as, for example, radio frequency and light wave transmissions. The computer readable media may take the form of coded formats that are decoded for actual use in a particular data processing system.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method, in a data processing system, for checking for viruses comprising:
    responsive to receiving a request, from an input-output processor, to write data from a file, initiating a real-time virus checker embedded on a data transfer device of the data processing system;
    scanning the data, with the real-time virus checker, using a combination of at least one heuristic technique and at least one virus dictionary, to determine whether the file contains a virus;
    responsive to determining that the file contains the virus, using the data transfer device to flag the file;
    notifying a modified device driver that the file contains the virus; and
    invoking an anti-virus program to perform a scan of the file using the modified device driver, wherein invoking an anti-virus program to perform the scan of the file containing the virus is performed by the modified device driver, and wherein the modified device driver invokes the anti-virus program to perform a scan of the entire file suspected of containing a virus in response to receiving notification of a flagged file, wherein the modified device driver utilizes a dynamic link library file to invoke the anti-virus program to perform a scan of the file.

2. The method of claim 1 further comprising:
    modifying a device driver to accept notification of a flagged file.

3. The method of claim 1 wherein invoking the anti-virus program to perform the scan of the file containing the virus is performed using a dynamic link library file.

4. A computer program product comprising a tangible computer readable medium storing executable instructions for checking for viruses in a data transfer device, the computer program product comprising:
    instructions for initiating a real-time virus checker embedded on a data transfer device of a data processing system, responsive to receiving a request from an input-output processor to write data from a file;
    instructions, for scanning the data using a combination of at least one heuristic technique and at least one virus dictionary, to determine whether the file contains a virus, wherein the data is scanned using the real-time virus checker stored on the data transfer device;
    instructions, responsive to determining that file contains the virus flagging the file using the data transfer device;
    instructions for notifying a modified device driver that the file contains a virus; and
    instructions, for invoking an anti-virus program to perform a scan of the file using the modified device driver, wherein invoking an anti-virus program to perform the scan of the file containing the virus is performed by the modified device driver, and wherein the modified device driver invokes the anti-virus program to perform a scan of the entire file suspected of containing a virus in response to receiving notification of a flagged file, wherein the modified device driver utilizes a dynamic link library file to invoke the anti-virus program to perform a scan of the file.

5. A data processing system for checking for viruses in a data transfer device, comprising:
    storage medium for storing real time virus checker on a controller
    initiating means for initiating a real-time virus checker embedded on a data transfer device of a data processing system, responsive to receiving a request from an input-output processor to write data from a file;
    scanning means for scanning data, with the real-time virus checker, using a combination of at least one heuristic technique and at least one virus dictionary, to determine whether the file contains a virus;
    flagging mechanism for flagging the file responsive to determining that the file contains the virus;
    notifying means for notifying a modified device driver that the file contains the virus; and
    invoking mechanism for invoking an anti-virus program to perform a scan of the file using the modified device driver, wherein invoking an anti-virus program to perform the scan of the file containing the virus is performed by the modified device driver, and wherein the modified device driver invokes the anti-virus program to perform a scan of the entire file suspected of containing a virus in response to receiving notification of a flagged file, wherein the modified device driver utilizes a dynamic link library file to invoke the anti-virus program to perform a scan of the file.

6. The data processing system of claim 5 further comprising:
    a modifying mechanism for modifying a device driver to accept notification of a flagged file.

* * * * *